J. S. & B. L. BAIN.
SEED CORN DRYING RACK.
APPLICATION FILED APR. 14, 1913.
1,089,810.
Patented Mar. 10, 1914.
2 SHEETS—SHEET 2.
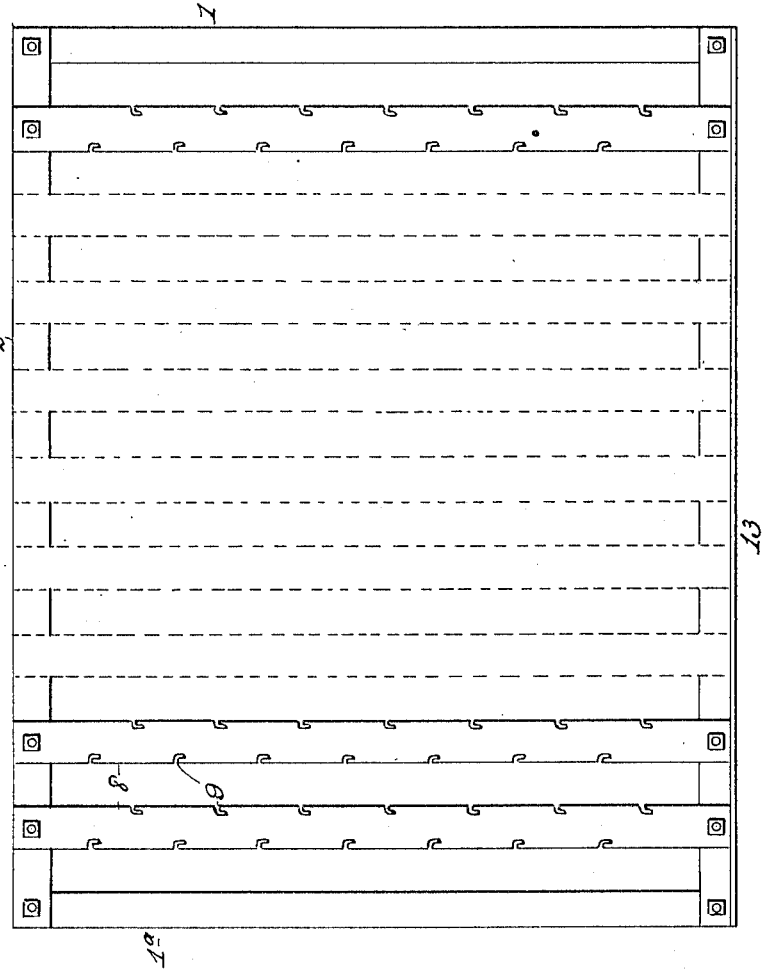

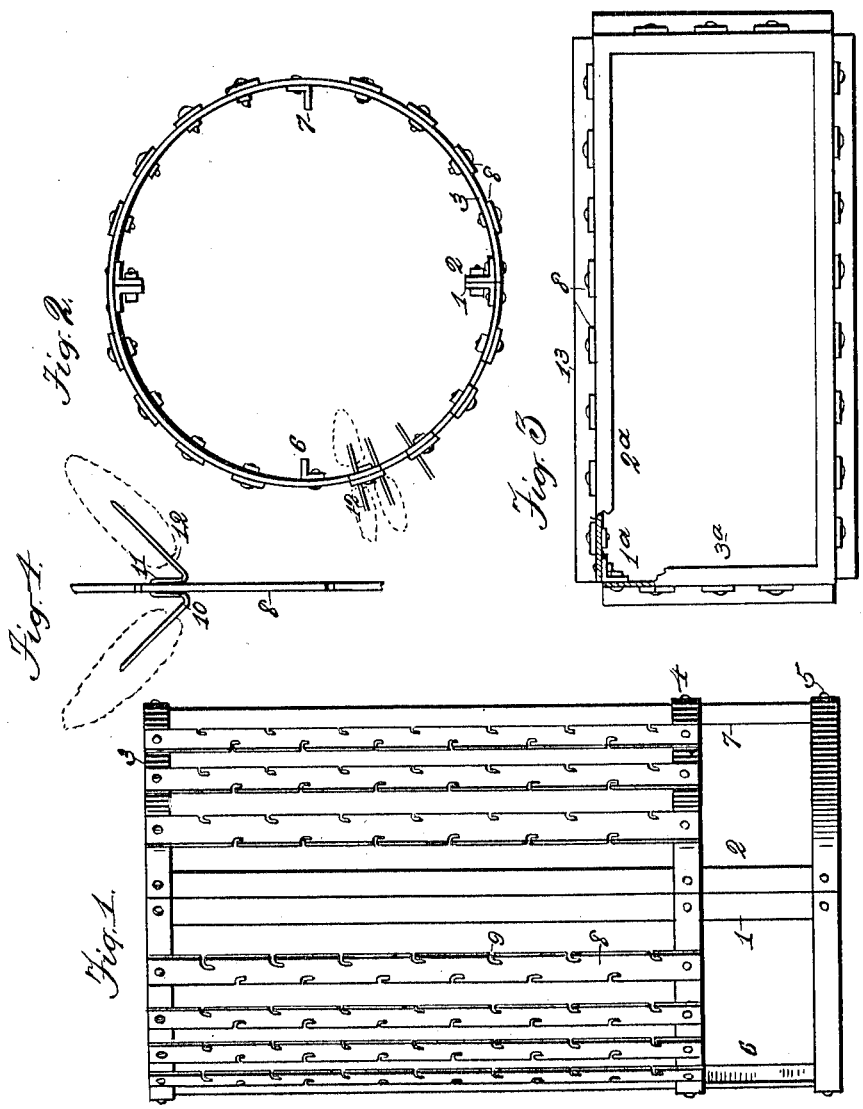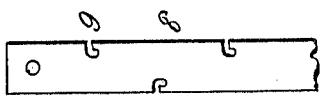

UNITED STATES PATENT OFFICE.

JOSEPH SMITH BAIN AND BENJAMIN LANGFORD BAIN, OF CEDAR RAPIDS, IOWA.

SEED-CORN-DRYING RACK.

1,089,810.   Specification of Letters Patent.   Patented Mar. 10, 1914.

Application filed April 14, 1913. Serial No. 761,102.

*To all whom it may concern:*

Be it known that we, JOSEPH SMITH BAIN and BENJAMIN LANGFORD BAIN, citizens of the United States, residing at Cedar Rapids, in the county of Linn and State of Iowa, have invented certain new and useful Improvements in Seed-Corn-Drying Racks, of which the following is a specification.

This invention relates to devices for drying seed corn, and embodies certain improvements upon the device for this purpose for which Letters Patent were issued to the applicants herein on May 14th, 1912, such patent being numbered 1,026,550.

In the patent to which reference has been made, the device comprised a series of horizontal rings attached to upright posts and wire hangers for the ears of corn, adapted to hang on said encircling rings.

The device herein illustrated, when constructed in circular form, employs two rings for support, to which rings are attached at the upper and lower ends a series of vertical slats or bars, which are suitably notched at the sides to provide hooks to receive said hangers for the corn ears. Similarly, when the device is built in rectangular form, the upright slats are attached to upper and lower bars.

In the accompanying drawing, forming a part of this specification, Figure 1 illustrates a side elevation of the circular type of drier, Fig. 2 is a plan view of the same, Fig. 3 is a plan view of a drier of the rectangular type, Fig. 4 is a detail illustrating one of the hangers suspended from one of the vertical bars seen edgewise, and Fig. 5 is a fragmentary detail showing a part of one of the vertical slats. Fig. 6 is a side elevation of the device shown in Fig. 3.

In the drawing, 1 and 2 designate upright angle irons, to which are suitably attached, as by bolting, semi-circular bands 3, 4 and 5. These are also attached to intermediate upright angle irons 6 and 7.

By reference to Fig. 2, it will be seen that when the angle irons 1 and 2 are bolted together, the structure becomes cylindrical and rests upon the bottom ring 5, which serves as its base. To the rings 3 and 4 are suitably bolted vertical slats 8, which are notched at 9 in an alternative or staggered order on opposite sides, as shown. These notches form hooks to receive the hangers 10, which are formed of wire looped at 11 and with upturned diverging prongs 12, adapted to be thrust into the corn cobs, and thus support the ears in the position indicated by the dotted outline in Fig. 4.

The special advantages arising from this construction as compared with that shown in the patent referred to, are:—

First, straight stock may be used for the slats, thus avoiding the necessity of bending them to circular form. This admits of much closer packing of the slats for shipment than would be possible in the case of circular bands.

Second, the notches which support the hangers being at fixed and pre-determined distances apart, it is impossible to carelessly hang the ears too close together, as might be the case in the use of the circular bands shown in the patent referred to.

Third, when made in the rectangular form shown in Figs. 3 and 6, straight pieces of stock may be used throughout the entire construction, thus avoiding the bending of any parts thereof.

Fourth, the arrangement of the hangers in staggered order makes it possible to hang the largest possible amount of corn in the smallest space, and without any contact of the corn ears with each other, or with their supports, at any point where such contact could injuriously affect the grain.

The rectangular structure is clearly shown in Figs. 3 and 6 and comprises corner posts $1^a$, upper horizontal bars $2^a$ and $3^a$ and lower horizontal bars 13. To these are bolted the vertical slats 8, as shown. In this style of construction the device may be shipped to its destination completely knocked down, and may there be erected by the user by simply bolting together.

The general advantages arising from the use of a drier of this nature have been set forth at length in the patent referred to, and need not be herein enlarged upon.

Having thus described our invention, we claim:

1. In a seed corn drier, combined with a suitable supporting frame, a series of upright slats, notched in staggered order on opposite sides, and corn-ear hangers adapted to rest in said notches, substantially as described.

2. A seed corn hanger comprising upright posts connecting horizontal bars, and upright slats attached to said bars, the slats being provided with notches forming alternating hooks at opposite sides, adapted to retain the corn ear hangers and hangers adapted to rest in said notches.

In testimony whereof we affix our signatures in presence of two witnesses.

JOSEPH SMITH BAIN.
BENJAMIN LANGFORD BAIN.

Witnesses:
J. M. St. John,
R. J. Miller.

Copies of this patent may be obtained for five cents each, by addressing the "Commissioner of Patents, Washington, D. C."